(12) United States Patent
Yoshida

(10) Patent No.: US 11,510,123 B2
(45) Date of Patent: Nov. 22, 2022

(54) ELECTRONIC APPARATUS AND COMMUNICATION CONTROL METHOD

(71) Applicant: SEIKO EPSON CORPORATION, Tokyo (JP)

(72) Inventor: Yutaka Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 17/328,161

(22) Filed: May 24, 2021

(65) Prior Publication Data

US 2021/0377835 A1 Dec. 2, 2021

(30) Foreign Application Priority Data

May 26, 2020 (JP) .............................. JP2020-091414

(51) Int. Cl.
| | |
|---|---|
| *H04W 4/00* | (2018.01) |
| *H04W 36/08* | (2009.01) |
| *H04W 8/00* | (2009.01) |
| *H04W 84/12* | (2009.01) |

(52) U.S. Cl.
CPC ........... *H04W 36/08* (2013.01); *H04W 8/005* (2013.01); *H04W 84/12* (2013.01)

(58) Field of Classification Search
CPC ...... H04W 36/08; H04W 8/005; H04W 84/12
See application file for complete search history.

(56) References Cited

U.S. PATENT DOCUMENTS

| | | | |
|---|---|---|---|
| 2013/0166200 A1* | 6/2013 | Dhanani | G01C 21/26 701/465 |
| 2014/0269575 A1* | 9/2014 | Zhang | H04L 5/0032 370/329 |
| 2017/0318524 A1 | 11/2017 | Goto | |
| 2021/0099946 A1* | 4/2021 | Hartmann | H04W 48/10 |

FOREIGN PATENT DOCUMENTS

| | | |
|---|---|---|
| JP | 2013-115539 A | 6/2013 |
| JP | 2017-200136 A | 11/2017 |

\* cited by examiner

*Primary Examiner* — Justin Y Lee
(74) *Attorney, Agent, or Firm* — Workman Nydegger

(57) ABSTRACT

An electronic apparatus includes a wireless communication section that performs wireless communication through an external access point, a processing section that performs communication control of the wireless communication section, and a storage section. The storage section stores, in association with each other, terminal identification information for identifying the terminal device that performed wireless communication through the first access point and identification information for identifying the first access point. The wireless communication section performs a packet capturing process. The processing section determines, based on a capturing result, the identification information of the first access point, and the terminal identification information of the terminal device, whether switching from the first access point is performed.

10 Claims, 11 Drawing Sheets

FIG. 4
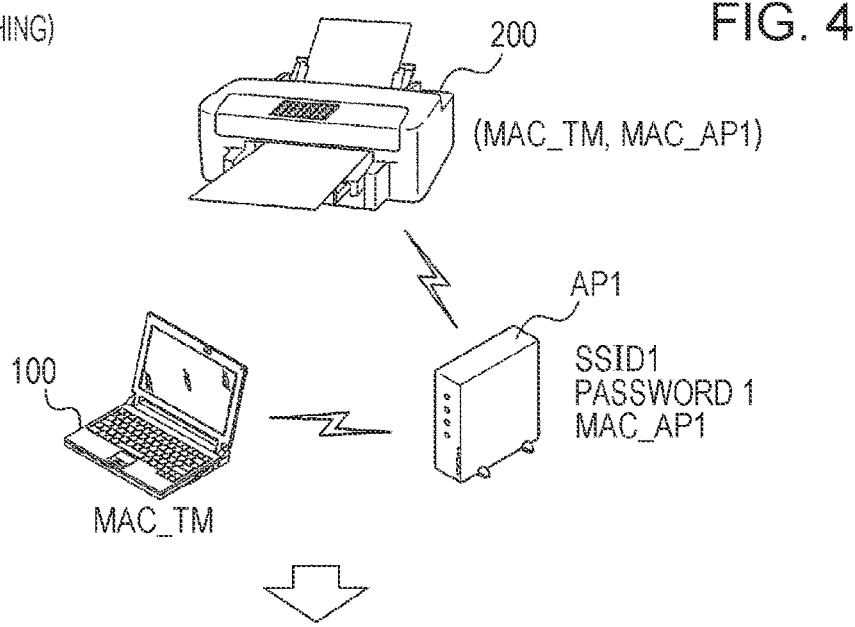
(A1: BEFORE SWITCHING)
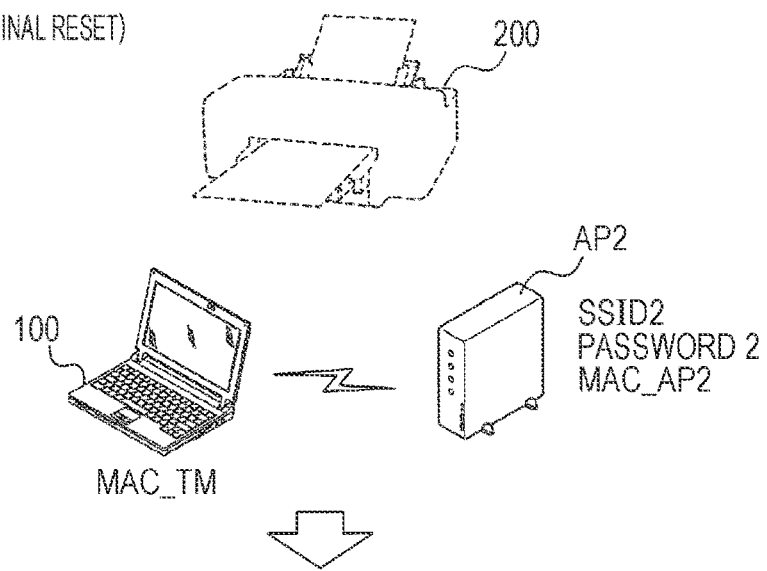
(A2: SWITCHING, TERMINAL RESET)
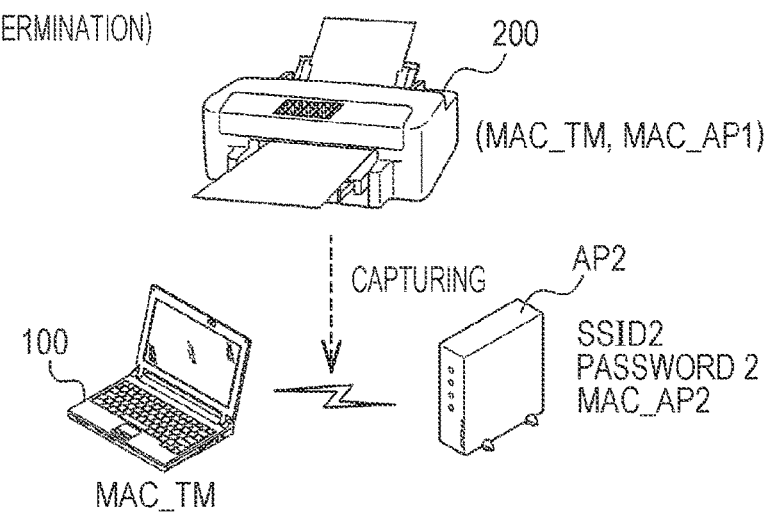
(A3: SWITCHING DETERMINATION)

FIG. 9

| TRANSMISSION SOURCE IDENTIFICATION INFORMATION (TRANSMISSION SOURCE MAC ADDRESS) | TRANSMISSION DESTINATION IDENTIFICATION INFORMATION (TRANSMISSION DESTINATION MAC ADDRESS) | TRANSMISSION SOURCE IP ADDRESS | TRANSMISSION DESTINATION IP ADDRESS | TRANSMISSION SOURCE PORT NUMBER | TRANSMISSION DESTINATION PORT NUMBER | ... |
|---|---|---|---|---|---|---|

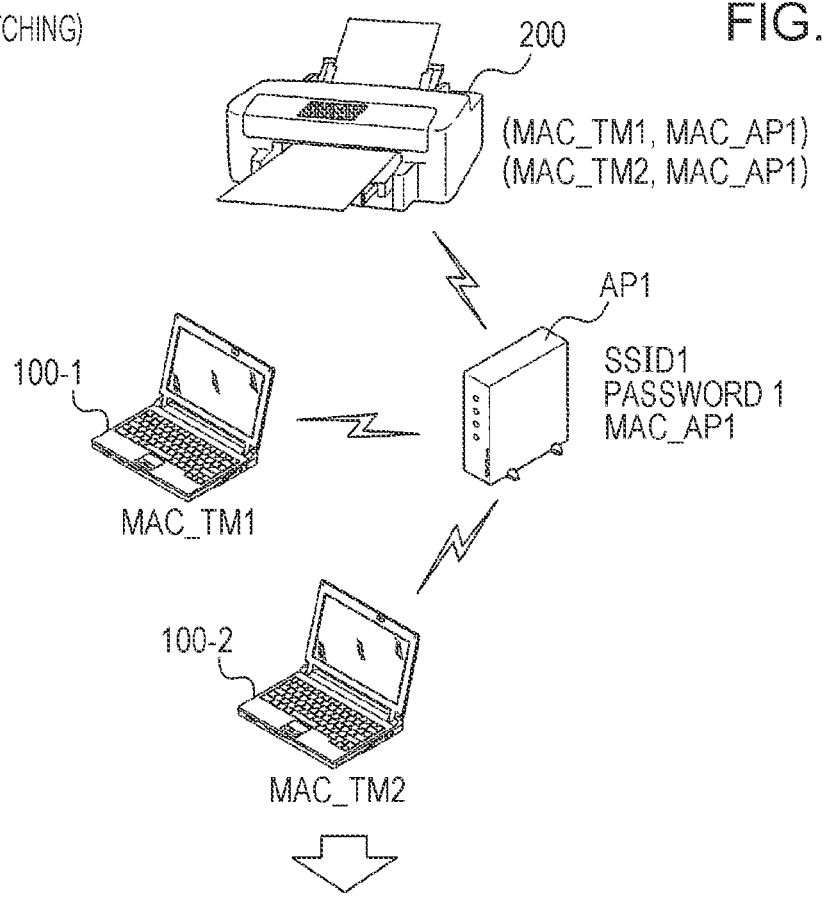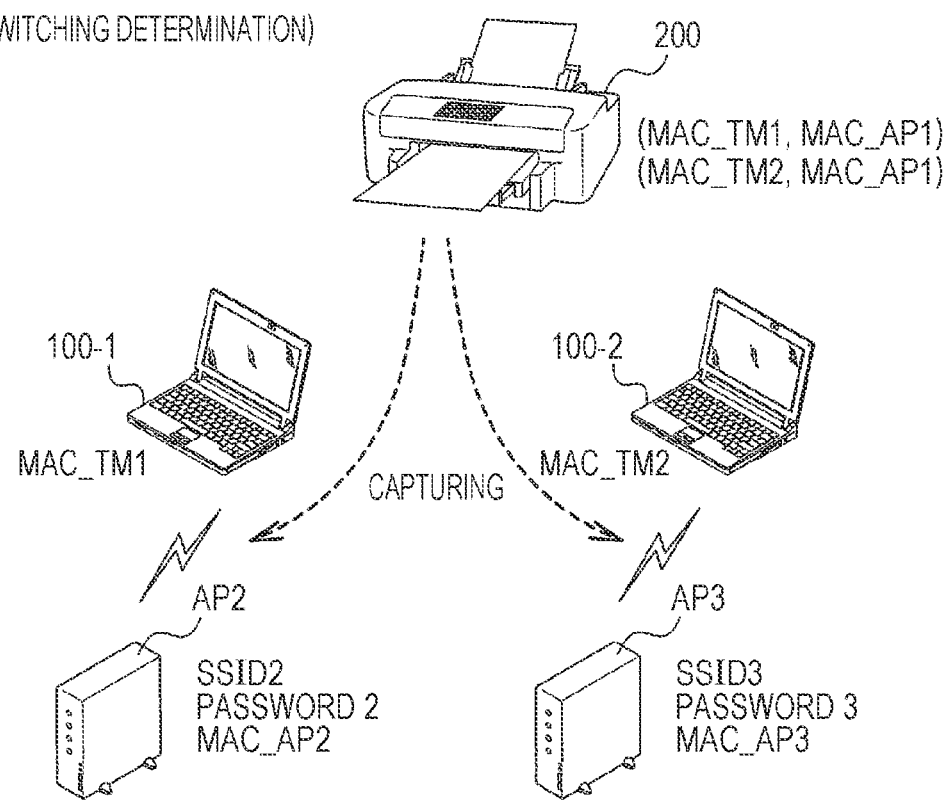
FIG. 12

ELECTRONIC APPARATUS AND COMMUNICATION CONTROL METHOD

The present application is based on, and claims priority from JP Application Serial Number 2020-091414, filed May 26, 2020, the disclosure of which is hereby incorporated by reference herein in its entirety.

BACKGROUND

1. Technical Field

The present disclosure relates to an electronic apparatus, a communication control method, and the like.

2. Related Art

In a network environment that has been set up, a user may switch an access point. A device connected to an access point before the switching may not perform communication through an access point after the switching unless wireless communication is reset.

For example, JP-A-2013-115539 discloses a wireless LAN access point device that operates as an access point by obtaining a wireless configuration from another wireless LAN access point. Furthermore, JP-A-2017-200136 discloses a communication device that is, even when an access point is changed, connected to another communication device connected to an access point before change.

A user may not recognize that reset of an electronic apparatus is required when an access point is switched. In such a case, it is difficult to employ the methods of the related art disclosed in JP-A-2013-115539, JP-A-2017-200136, and the like. Furthermore, it is difficult to specify a factor of the situation that the electronic apparatus may not perform wireless communication.

SUMMARY

According to an aspect of the present disclosure, an electronic apparatus includes a wireless communication section configured to perform wireless communication through an access point external to the electronic apparatus, a processing section configured to perform communication control of the wireless communication section, and a storage section. In a state in which the wireless communication section and a first access point are connected with each other, the storage section stores, in association with each other, terminal identification information for identifying a terminal device that performed wireless communication through the first access point and identification information for identifying the first access point. The wireless communication section performs a process of capturing a packet that is transmitted from or received by, through wireless communication, the terminal device specified by the terminal identification information. When determining, based on a capturing result of the process of capturing, the identification information of the first access point, and the terminal identification information of the terminal device, that the terminal device performs wireless communication with a second access point that is different from the first access point, the processing section determines that switching from the first access point is performed.

According to another aspect of the present disclosure, a communication control method includes in a state in which connection to a first access point is established, storing, in association with each other, terminal identification information for identifying a terminal device that performed wireless communication through the first access point and identification information for identifying the first access point, when the connection to the first access point is disconnected, performing a process of capturing a packet that is transmitted from or received by, through wireless communication, the terminal device specified by the terminal identification information, and when determining, based on a capturing result of the process of capturing, the identification information of the first access point, and the terminal identification information of the terminal device, that the terminal device performs wireless communication with a second access point that is different from the first access point, determining that switching from the first access point is performed.

BRIEF DESCRIPTION OF THE DRAWINGS

FIG. 4 is a diagram illustrating a method according to an embodiment.

FIG. 9 is a diagram illustrating an example of a data configuration of a capturing result.

FIG. 12 is a diagram illustrating a method according to a modification.

DESCRIPTION OF EXEMPLARY EMBODIMENTS

Hereinafter, a preferred embodiment of the present disclosure will be described in detail. Note that the embodiment described below does not unduly limit content described in claims, and it is not necessarily the case that all components described in this embodiment are requirements.

1. Brief Description of System Configuration and Process

Figure 1:
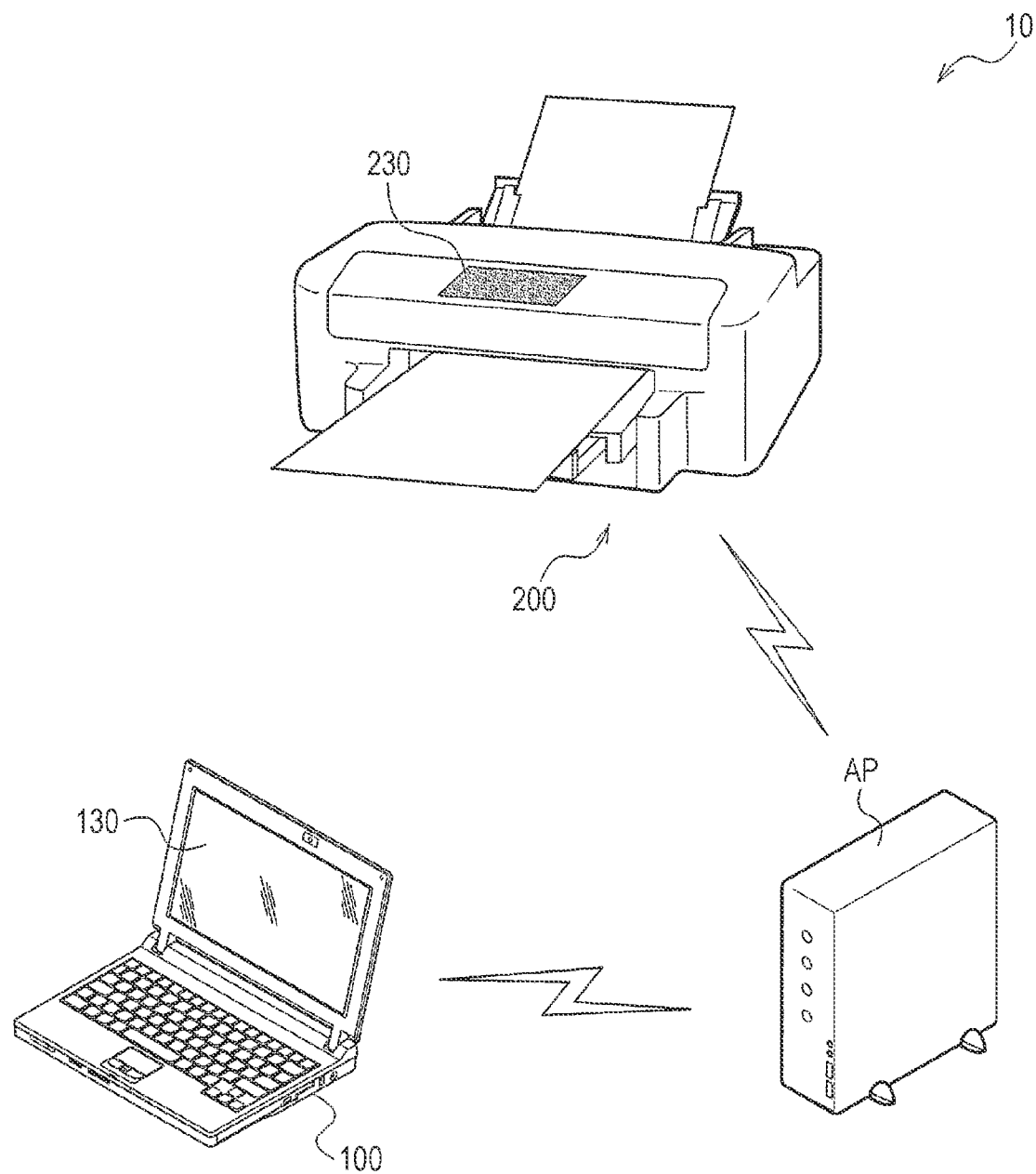
FIG. 1 is a diagram illustrating a configuration of a communication system including an electronic apparatus.

FIG. 1 is a diagram schematically illustrating an example of a communication system 10 including an electronic apparatus 200 of this embodiment. The communication system 10 includes a terminal device 100 and the electronic apparatus 200. The terminal device 100 and the electronic apparatus 200 are individually connected to an external access point AP. The access point AP is specifically a wireless LAN access point, or a wireless LAN router having a router function, for example.

The terminal device 100 is an information processing apparatus, such as a personal computer (PC). Note that the terminal device 100 may be a mobile terminal device, such as a smartphone or a tablet terminal.

The electronic apparatus 200 is a printer, for example. Alternatively, the electronic apparatus 200 may be a scanner, a facsimile device, or a photocopier. The electronic apparatus 200 may be a multifunction peripheral (MFP) having a plurality of functions, and a multifunction peripheral having a printer function is also an example of a printer. Alternatively, the electronic apparatus 200 may be a projector, a head-mounted display device, a wearable apparatus, a biological information measuring apparatus, a robot, a video apparatus, a physical quantity measuring apparatus, or the like. Examples of the biological information measuring apparatus include a pulsimeter, a pedometer, and a physical activity meter. Examples of the video apparatus include a camera.

The terminal device 100 and the electronic apparatus 200 individually perform wireless communication with the access point AP. Here, the term "wireless communication" means communication employing a Wi-Fi method in a narrow sense. The Wi-Fi method is a wireless communication method based on the Institute of Electrical and Electronics Engineers (IEEE) 802.11 standard or some other standards equivalent to that.

The terminal device 100 and the electronic apparatus 200 perform communication through the external access point AP. For example, the electronic apparatus 200 performs a process of executing a job when receiving a job execution instruction from the terminal device 100. The electronic apparatus 200 is a printer, for example, and the job described herein is a print job, for example. The print job is information including information on an image to be printed and print setting information. The print setting information specifies setting values for setting items, such as a sheet size, single-side printing or both-side printing, and color printing or monochrome printing. Note that the job described herein is not limited to the print job and may be expanded to various processes to be executed using functions of the electronic apparatus 200.

Figure 2:
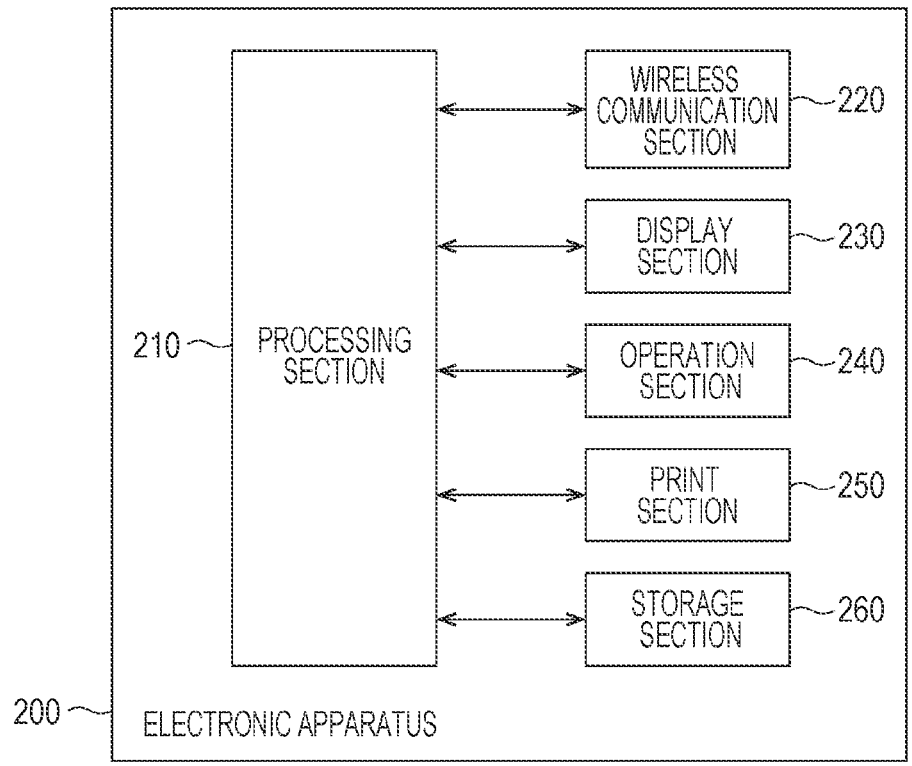
FIG. 2 is a diagram illustrating a configuration of the electronic apparatus.

FIG. 2 is a block diagram illustrating an example of a configuration of the electronic apparatus 200. Note that the electronic apparatus 200 in FIG. 2 has a print function, and an example in which the electronic apparatus 200 is a printer will also be described where appropriate hereinafter. Note that, as described above, the electronic apparatus 200 may be expanded to be other than the printer. The electronic apparatus 200 includes a processing section 210, a wireless communication section 220, a display section 230, an operation section 240, a print section 250, and a storage section 260.

The processing section 210 controls the sections included in the electronic apparatus 200. The sections included in the electronic apparatus 200 are, for example, the wireless communication section 220, the storage section 260, and the print section 250. The processing section 210 is specifically a processor or a controller. For example, the processing section 210 may include a plurality of central processing units (CPUs), such as a main CPU and a sub CPU. The main CPU controls the sections included in the electronic apparatuses 200 and the entire electronic apparatus 200. The sub CPU controls communication performed by the wireless communication section 220, for example. Alternatively, when the electronic apparatus 200 is a printer, a CPU that performs various processes associated with printing may be further included.

The processing section 210 of this embodiment is configured by hardware described below. The hardware may include at least one of a circuit processing digital signals and a circuit processing analog signals. For example, the hardware is configured by at least one circuit device or at least one circuit element that are implemented in a circuit substrate. Examples of the at least one circuit device include an integrated circuit (IC) and a field-programmable gate array (FPGA). Examples of the at least one circuit element include a resistor and a capacitor.

Furthermore, the processing section 210 may be realized by a processor below. The electronic apparatus 200 of this embodiment includes a memory storing information and a processor operating based on the information stored in the memory. Examples of the information include programs and various data. The processor includes hardware. As the processor, various types of processor may be used, such as a CPU, a graphics processing unit (GPU), and a digital signal processor (DSP). The memory may be a semiconductor memory, such as a static random access memory (SRAM) or a dynamic random access memory (DRAM), a register, a magnetic storage device, such as a hard disk device, or an optical storage device, such as an optical disc device. For example, the memory stores computer-readable instructions, and functions of the processing section 210 are realized as processes when the processor executes the instructions. Examples of the instructions include instructions of an instruction set constituting a program or an instruction that a hardware circuit of the processor should execute some operation. Furthermore, the entire processing section 210 or a portion of the processing section 210 may be realized by cloud computing.

The wireless communication section 220 performs wireless communication based on the Wi-Fi method. Note that the wireless communication section 220 may execute wireless communication based on a method other than the Wi-Fi method. The wireless communication section 220 performs near field communication, for example. The near field communication described herein is wireless communication based on the Bluetooth (registered trademark) method, for example. The Bluetooth method is a wireless communication method based on the IEEE 802.15.1 standard or some other standards equivalent to that. The wireless communication based on the Bluetooth method may be based on Bluetooth low energy (BLE), for example. Note that the near field wireless communication is based on not only the Bluetooth method but also other methods.

The wireless communication section 220 is realized by at least one wireless communication device. The wireless communication device may also be referred to as a wireless communication chip. Note that examples of the wireless communication section 220 include a wireless communication device that executes wireless communication based on the Wi-Fi method. Furthermore, the examples of the wireless communication section 220 include a wireless communication device that executes wireless communication based on a method other than the Wi-Fi-method, such as BLE.

The display section 230 is constituted by a display or the like that displays various information for a user. The operation section 240 includes a button or the like that receives an input operation performed by the user. Note that the display section 230 and the operation section 240 may be integrally configured as a touch panel, for example. Furthermore, the electronic apparatus 200 may include a notification section that makes a notification differently from the display section 230. The notification section described herein may perform notification by blinking of light or the like, sound, or vibration. The notification section includes at least one of a light source, such as a light emitting diode (LED), a speaker, and a vibration motor.

The print section 250 includes a print engine. The print engine is a mechanical component that executes printing of an image on a print medium. The print engine includes a transport mechanism, an ejection head employing an ink jet method, and a driving mechanism for a carriage including the ejection head. The print engine prints an image on a print medium by causing the ejection head to eject ink to the print medium transported from the transport mechanism. The print medium may be paper, fabric, or other media. Note that a specific configuration of the print engine is not limited to that illustrated, and may perform printing using toner in an electrophotographic method.

The storage section 260 stores various information including data and programs. The processing section 210 and the wireless communication section 220 operate using the storage section 260 as a work area, for example. The storage section 260 may be a semiconductor memory, such as an SRAM or a DRAM, a register, a magnetic storage device, or an optical storage device. The storage section 260 may store data wirelessly transmitted from the terminal device 100 connected to the access point AP. The data described herein is image information and print setting information to be used for printing performed by the print section 250, for example. Furthermore, the storage section 260 stores terminal identification information of the terminal device 100 that executes a job and identification information of an access point AP in association with each other. Moreover, the storage section 260 may store job record information of the terminal device 100.

Figure 3:
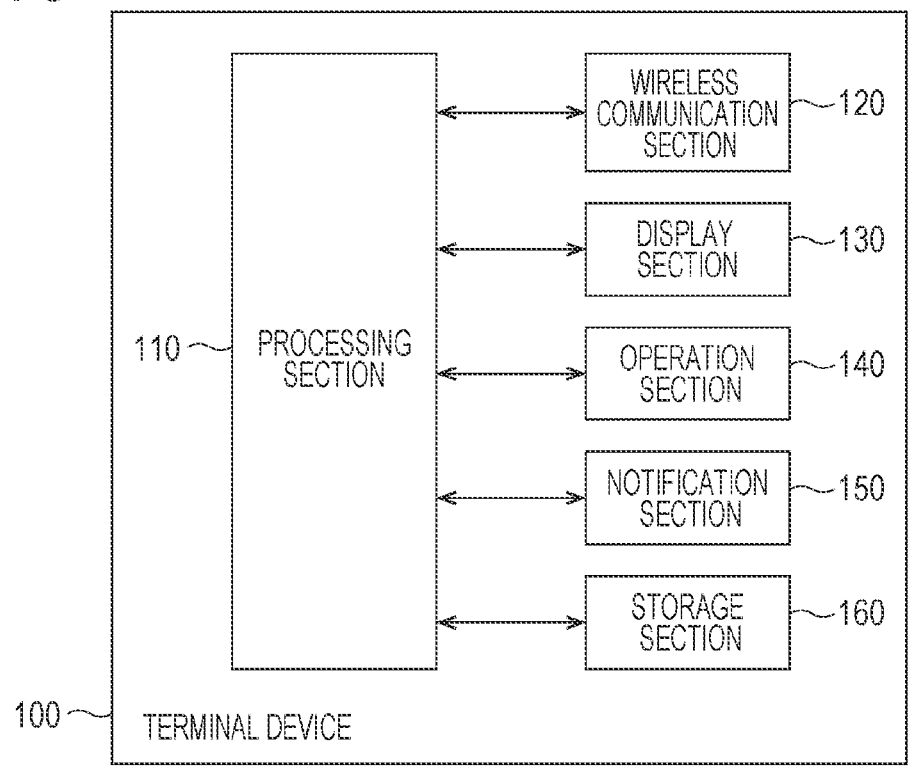
FIG. 3 is a diagram illustrating a configuration of a terminal device.

FIG. 3 is a block diagram illustrating an example of a configuration of the terminal device 100. The terminal device 100 includes a processing section 110, a wireless communication section 120, a display section 130, an operation section 140, a notification section 150, and a storage section 160.

The processing section 110 controls each of the wireless communication section 120, the display section 130, the operation section 140, the notification section 150, and the storage section 160. The processing section 110 is specifically a processor or a controller.

The processing section 110 is constituted by hardware including at least one of a circuit processing digital signals and a circuit processing analog signals. For example, the hardware is configured by at least one circuit device or at least one circuit element that are implemented in a circuit substrate.

Furthermore, the processing section 110 may be realized by a processor including hardware. The terminal device 100 of this embodiment includes a memory storing information and a processor operating based on the information stored in the memory. Examples of the information include programs and various data. As the processor, various processors may be used, such as a CPU, a GPU, and a DSP. As the memory, a semiconductor memory, a register, a magnetic storage device, an optical storage device, or the like may be used. For example, the memory stores computer-readable instructions, and functions of the processing section 110 are realized as processes when the processor executes the instructions. Furthermore, the entire processing section 110 or a portion of the processing section 110 may be realized by cloud computing.

The wireless communication section 120 is realized by at least one wireless communication device. The wireless communication device may also be referred to as a wireless communication chip. Examples of the wireless communication device described herein include a wireless communication device that executes wireless communication based on the Wi-Fi method. Furthermore, the examples of the wireless communication section 220 include a wireless communication device that executes wireless communication based on a method other than the Wi-Fi method, such as BLE.

The display section 130 is constituted by a display or the like that displays various information for the user. The operation section 140 includes a button or the like that receives an input operation performed by the user. Note that the display section 130 and the operation section 140 may be integrally configured as a touch panel, for example. The notification section 150 makes a notification for the user. The notification section 150 may be a speaker that makes a notification by sound, a vibration section that makes a notification by vibration, or a combination of these.

The storage section 160 stores various information including data and programs. The processing section 110 and the wireless communication section 120 operate using the storage section 160 as a work area, for example. The storage section 160 may be a semiconductor memory, such as an SRAM or a DRAM, a register, a magnetic storage device, or an optical storage device. The storage section 160 may store information associated with history of connection to the access point AP, for example.

FIG. 4 is a diagram schematically illustrating a process according to this embodiment. A1 in FIG. 4 illustrates a state before the access point AP is switched. In the example illustrated in A1, the terminal device 100 and the electronic apparatus 200 are individually connected to a first access point AP1 serving as the external access point AP. For example, the terminal device 100 and the electronic apparatus 200 individually have connection information required for connection to the access point AP1 and are connected to the first access point AP1 by using the connection information. The connection information includes a service set identifier (SSID) and password of the access point AP serving as a connection target. The SSID described herein includes an extended SSID (ESSID). Note that the SSID of the first access point AP1 is denoted by SSID1 and the password of the first access point AP1 is represented as a password 1. The connection information may include other information, such as security information.

In the state illustrated in A1, the terminal device 100 and the electronic apparatus 200 may execute wireless communication through the first access point AP1. For example, the terminal device 100 instructs the electronic apparatus 200 to execute a job, and the electronic apparatus 200 executes the job, such as a print job.

Note that, although described in detail below, the electronic apparatus 200 stores, in the state illustrated in A1, identification information for identifying the first access point AP1 and terminal identification information for identifying the terminal device 100 in association with each other. The identification information for identifying the first access point AP1 is a MAC address of the first access point AP1, for example. Here, the MAC address of the first access point AP1 is denoted by MAC_AP1. Furthermore, the terminal identification information is a MAC address of the terminal device 100. Here, the MAC address of the terminal device 100 is denoted by MAC_TM.

The user may switch the access point AP due to replacement or the like. It is assumed that the user discards the first access point AP1 or moves the first access point AP1 to another location and newly introduces a second access point AP2. It is further assumed that an SSID of the second access point AP2 is denoted by SSID2 and a password of the second access point AP2 is represented as a password 2. It is estimated that the SSID2 and the password 2 are different from the SSID1 and the password 1. Therefore, when the terminal device 100 and the electronic apparatus 200 perform wireless communication through the external access point AP, the wireless communication is required to be reset.

A2 in FIG. 4 illustrates the reset caused by switching of the access point AP. For example, the terminal device 100, such as a PC or a smartphone, is highly frequently used, and therefore, communication through the access point AP is required in many cases. Therefore, as illustrated in A2, when the switching from the first access point AP1 to the second access point AP2 is performed, it is highly probable that the user resets the terminal device 100. For example, the user connects the terminal device 100 to the second access point AP2 by inputting the SSID2 and the password 2 to the terminal device 100.

However, since use frequency of the electronic apparatus 200 may be low, the user may not recognize that the reset is required. For example, when the electronic apparatus 200 is a printer, in a period of time when a print job is not executed, a problem seldom arises even when connection to the access point AP is disconnected. In particular, use frequency of a home-use printer is low in many cases, and such a home-use printer may be only used in a specific season, such as a year end, for example. In this case, the electronic apparatus 200 may be in a power-off state or may be accommodated in a state in which a line is detached in seasons other than the specific season. Therefore, when the access point AP is switched in a season other than the specific season, a time lag is generated from the switching to use of the electronic apparatus 200. Since the terminal device 100 is reset at the switching as illustrated in A2 of FIG. 4, the user recognizes that the reset associated with the switching has been completed. Accordingly, even when the electronic apparatus 200 may not be used in the specific season, it is difficult for the user to recognize that a reason thereof is the switching of the access point AP. Consequently, the user may not perform an appropriate operation for connecting the electronic apparatus 200 to the access point AP.

In JP-A-2013-115539 and JP-A-2017-200136, methods employed when the access point AP is switched are disclosed. However, these methods are employed when the user understands that reset of a connection apparatus is required due to switching of the access point AP. Specifically, the methods of the related art including the methods disclosed in JP-A-2013-115539 and JP-A-2017-200136 are not for smoothly resetting the electronic apparatus 200 when it is difficult for the user to recognize requirement of reset of the electronic apparatus 200.

The electronic apparatus 200 of this embodiment includes, as illustrated in FIG. 2, the wireless communication section 220 that performs wireless communication through the external access point AP, the processing section 210 that performs communication control of the wireless communication section 220, and the storage section 260. As illustrated in A1 of FIG. 4, in a state in which the wireless communication section 220 is connected to the first access point AP1, the storage section 260 stores terminal identification information for identifying the terminal device 100 that has performed the wireless communication through the first access point AP1 and identification information for identifying the first access point AP1 in association with each other. Then the wireless communication section 220 performs a process of capturing a packet that has been transmitted from or received by the terminal device 100 through the wireless communication. The processing section 210 determines that switching from the first access point AP1 is performed when it is determined, based on a capturing result of the capturing process, the identification information of the first access point AP1, and the terminal identification information of the terminal device 100, that the terminal device 100 performs wireless communication with the second access point AP2 different from the first access point AP1.

Here, the identification information and the terminal identification information are the MAC addresses of the apparatuses as described above, for example. Note that the identification information and the terminal identification information of this embodiment may be other information for identifying the access point AP and the terminal device 100. For example, the identification information and the terminal identification information may be other information that may be obtained in the capturing process of a packet and that identifies apparatuses that perform transmission and reception of the packet.

Furthermore, in the capturing process, a packet transmitted in a network is obtained. The wireless network is particularly assumed herein, and therefore, the capturing process receives electric waves to be used in the wireless communication and obtains, based on a result of the reception, information included in the packet.

For example, a wireless communication device included in the wireless communication section 220 of the electronic apparatus 200 is a Wi-Fi chip capable of operating in a monitor mode. In the monitor mode, the wireless communication device may obtain SSIDs of neighboring Wi-Fi networks and information on client devices connected to the networks. Furthermore, in the monitor mode, the wireless communication device may analyze transmitted and received packets. Note that an operation mode different from the monitor mode is referred to as a normal mode or a managed mode.

Furthermore, the storage section 260 of the electronic apparatus 200 may store software corresponding to network analyzer software that performs communication analysis of the network. The processing section 210 reads the software from the storage section 260 and operates in accordance with the read software so as to execute the process of capturing a packet used in the wireless communication. Note that, as described below, in the method of this embodiment, at least presence or absence of communication between the terminal device 100 and the access point AP is determined. More specifically, the processing section 210 at least specifies a MAC address of a transmission source and a MAC address of a transmission destination included in a MAC header of an IEEE802.11 packet, and a process of obtaining information on an upper-level layer, such as an internet protocol (IP) layer may not be required. Note that various types of Wi-Fi chip capable of operating in the monitor mode and various types of software similar to the network analyzer software have been widely used, and similar components may be used in this embodiment. Therefore, a detailed description of a specific configuration for the capturing process is omitted.

According to the method of this embodiment, switching of the external access point AP may be determined. Therefore, even when the user does not recognize that reset of an apparatus is required due to the switching of the access point AP, an appropriate operation, such as an operation of prompting the reset, may be performed. Furthermore, since information obtained before the switching and a capturing result are used, the switching determination may be executed with high accuracy.

Furthermore, the method of this embodiment may be employed in a communication control method and an information processing method that execute steps below. In the communication control method, in a state of connection to the first access point AP1, terminal identification information for identifying the terminal device 100 that has performed wireless communication through the first access point AP1 and identification information for identifying the first access point AP1 in association with each other are stored. Furthermore, in the communication control method, when the connection to the first access point AP1 is disconnected, a process of capturing a packet that has been transmitted from or received by the terminal device 100 specified by the terminal identification information is performed. Moreover, in the communication control method, it is determined that switching from the first access point AP1 has been performed when it is determined, based on a capturing result of the capturing process, the identification information of the first access point AP1, and the terminal identification information of the terminal device 100, that the terminal device 100 performs wireless communication with the second access point AP2 different from the first access point AP1.

2. Detailed Description of Process

Figure 5:
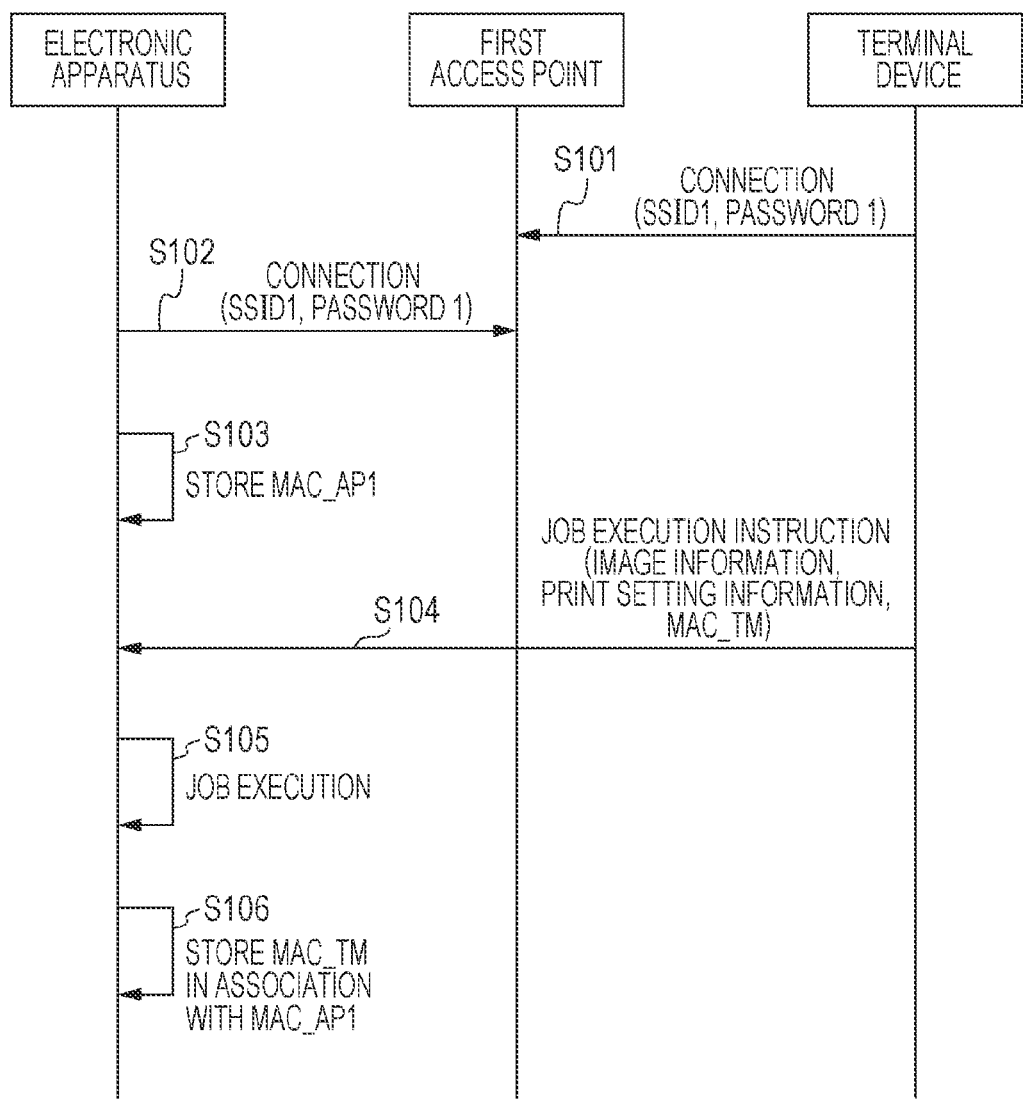
FIG. 5 is a diagram illustrating a flow of a process performed in connection to a first access point.

FIG. 5 is a diagram illustrating a flow of a process corresponding to A1 of FIG. 4. In step S101, the terminal device 100 is connected to the first access point AP1 using the SSID1 and the password 1. The process in step S101 may be performed when the user operating the operation section 140 of the terminal device 100 directly inputs the SSID1 and the password 1. Furthermore, a method for automating a wireless communication setting by executing a process according to specific software in the terminal device 100 and performing a specific operation in the access point AP has been used. In the wireless communication setting of the terminal device 100, such an automation method may be employed.

Furthermore, in step S102, the electronic apparatus 200 is connected to the first access point AP1 using the SSID1 and the password 1. The process in step S102 may be performed by the user directly inputting the SSID1 and the password 1 using the operation section 240 of the electronic apparatus 200 or by a publicly known automation method as described above. Note that the process in step S101 and the process in step S102 may be reversed. Furthermore, the wireless communication setting of the electronic apparatus 200 may be performed using the terminal device 100. For example, the terminal device 100 operates in accordance with software for setup that performs settings of a printer. More specifically, one of the terminal device 100 and the electronic apparatus 200 activates an internal access point and the other is connected to the internal access point so that the terminal device 100 and the electronic apparatus 200 are directly connected to each other. The terminal device 100 transmits the SSID1 and the password 1 that are connection information of the first access point AP1 to the electronic apparatus 200 using the direct connection.

In step S103, the electronic apparatus 200 obtains identification information of the connected first access point AP1. For example, the first access point AP1 periodically transmits a beacon signal including a MAC address of the first access point AP1. The beacon signal described herein is specifically SSID broadcast. The electronic apparatus 200 extracts the MAC address included in the beacon signal and stores the MAC address in the storage section 260 as identification information of the first access point AP1. Note that the electronic apparatus 200 may obtain a MAC address of the first access point AP1 using a packet different from the beacon signal.

After both the terminal device 100 and the electronic apparatus 200 are connected to the first access point AP1, the terminal device 100 instructs the electronic apparatus 200 to execute a job in step S104. For example, the terminal device 100 performs a process of selecting the electronic apparatus 200 as a printer to execute printing among at least one printer included in a network formed by the first access point AP1. Then the terminal device 100 instructs execution of a print job by transmitting information including image information and print setting information to the electronic apparatus 200.

In step S105, the electronic apparatus 200 executes, based on the received job execution instruction, the job. For example, the processing section 210 performs a process of forming an image on a print medium by controlling the print section 250.

Furthermore, in step S106, the electronic apparatus 200 stores the terminal identification information of the terminal device 100 serving as a transmission source of the job execution instruction. For example, a packet instructing job execution includes a MAC address of the terminal device 100 of the transmission source. The electronic apparatus 200 extracts the MAC address included in the packet and stores the MAC address in the storage section 260 as the terminal identification information of the terminal device 100 while associating the MAC address with the identification information of the first access point AP1.

Figure 6:
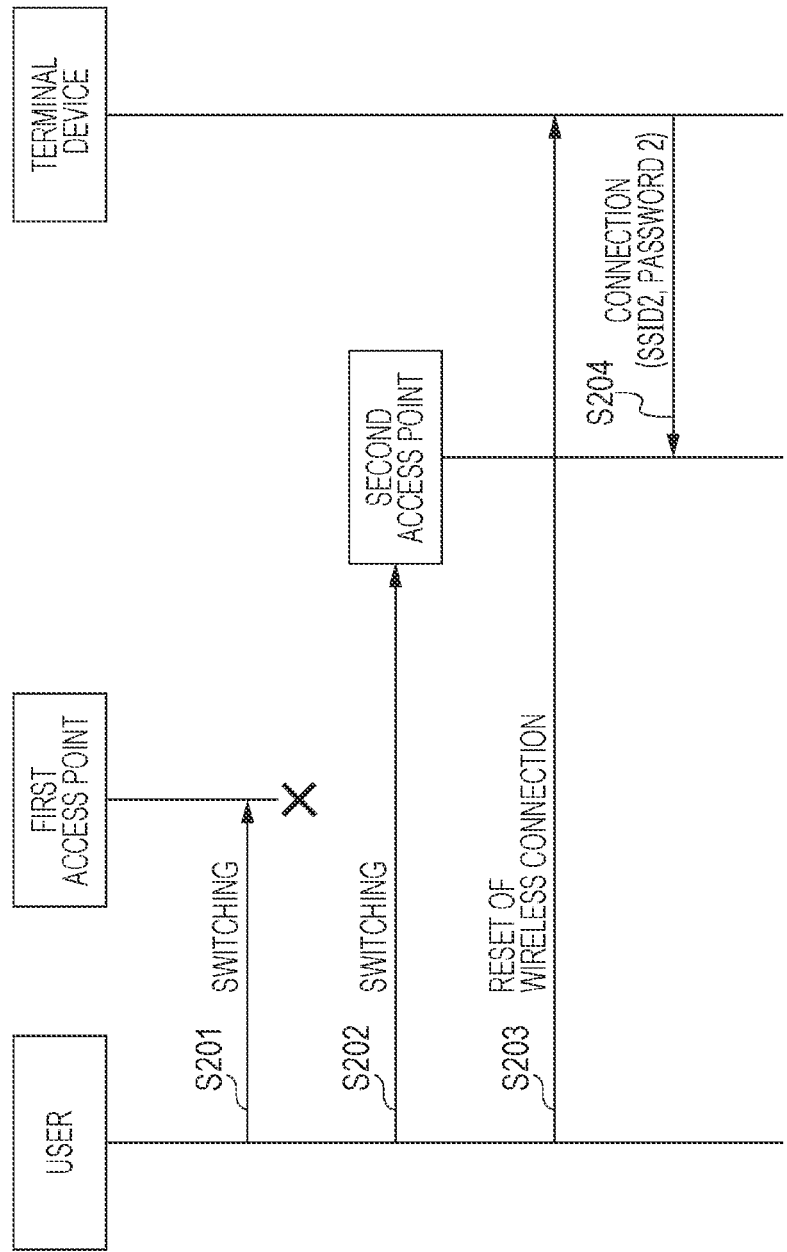
FIG. 6 is a diagram illustrating a flow of a process performed when an access point is switched.

FIG. 6 is a diagram illustrating a flow of a process corresponding to A2 of FIG. 4. Specifically, FIG. 6 is a diagram illustrating a flow of a process of performing switching of the access point AP and reset of wireless communication performed by the terminal device 100. First, in step S201 and step S202, the user removes the first access point AP1 from the environment and employs the second access point AP2. The process in step S202 includes an initial setting and the like of the second access point AP2. Note that the process in step S201 and the process in step S202 may be reversed. For example, the first access point AP1 and the second access point AP2 may be temporarily available at the same time.

After the initial setting of the second access point AP2 is completed, the user resets the terminal device 100 in step S203. The process in step S203 may be a process of directly inputting the SSID2 and the password 2 or an automation process.

In step S204, the terminal device 100 is connected to the second access point AP2 using the SSID2 and the password 2 obtained by the reset. Accordingly, the terminal device 100 enters a state in which wireless communication is available through the second access point AP2 after the switching.

Figure 7:
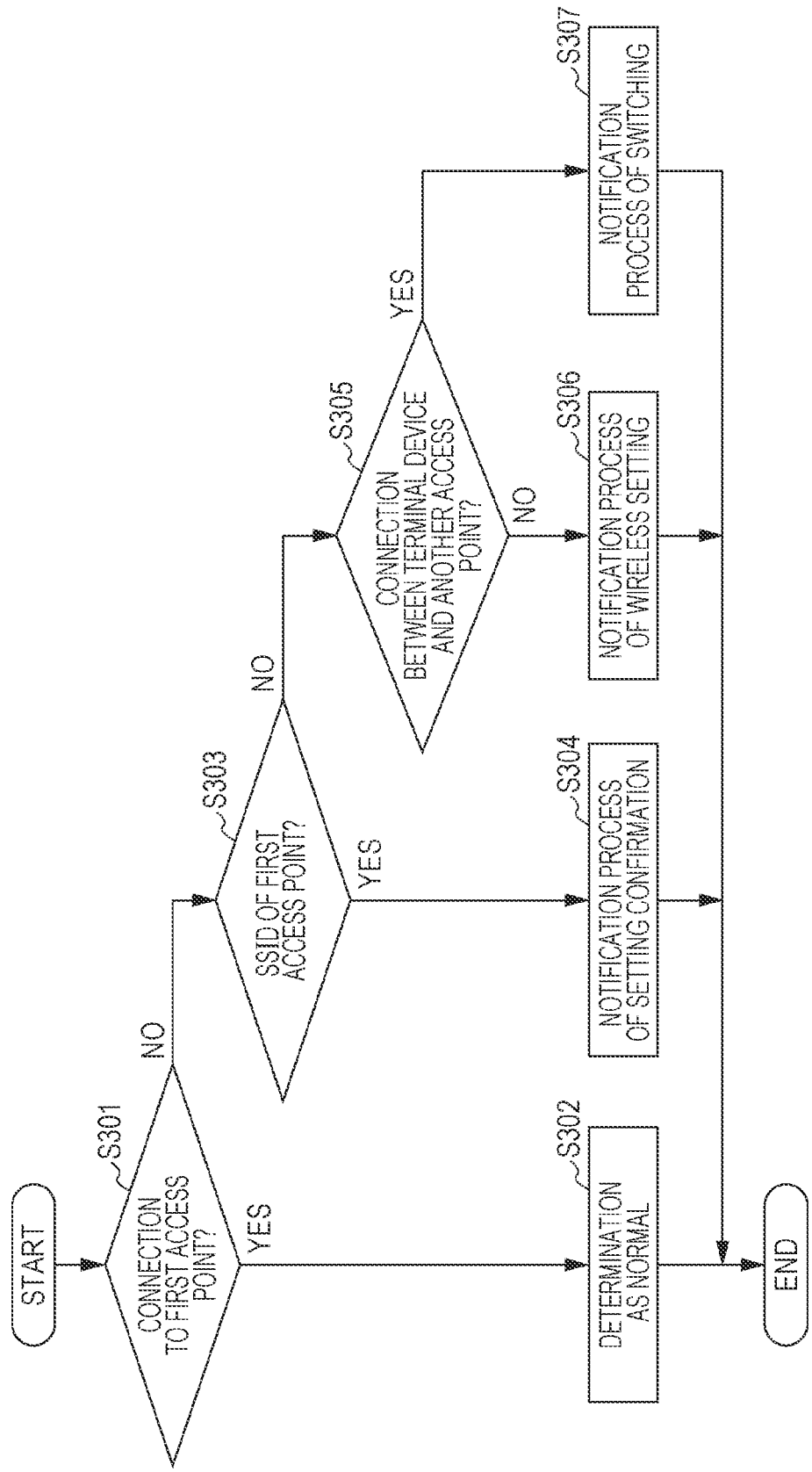
FIG. 7 is a flowchart of a process performed by the electronic apparatus.

FIG. 7 is a flowchart of a process periodically executed by the electronic apparatus 200. After this process is started, in step S301, the processing section 210 determines whether the wireless communication section 220 may be connected to the first access point AP1.

The process in step S301 may be a determination as to whether connection that has been established is maintained. For example, when the state of A1 of FIG. 4 is maintained without switching of the access point AP, the processing section 210 obtains an affirmative determination result in step S301. Alternatively, the process in step S301 may be a process of attempting connection to the access point AP that has been lastly connected. For example, when the electronic apparatus 200 in a power-off state or a sleep state is turned on, the processing section 210 reads connection information stored in the storage section 260. The connection information herein includes the SSID1 and the password 1, for example. The wireless communication section 220 attempts connection to the first access point AP1 that is in connection history using the SSID1 and the password 1. When the first access point AP1 maintains a state in which connection is available from the electronic apparatus 200, connection is established again, and therefore, the processing section 210 obtains an affirmative determination result in step S301.

When the determination is affirmative in step S301, the electronic apparatus 200 may execute wireless communication through the first access point AP1. Therefore, in step S302, the processing section 210 determines normal and terminates the process.

When the determination is negative in step S301, an error occurs in the wireless communication of the electronic apparatus 200. Therefore, the processing section 210 executes a process of specifying a factor of the error in the wireless communication. First, in step S303, the processing section 210 determines whether the SSID1 that is the SSID of the first access point AP1 exists. For example, the wireless communication section 220 executes SSID scanning for receiving beacon signals transmitted from neighboring access points AP. The processing section 210 determines whether the SSID1 is included in a list of SSIDs obtained by the SSID scanning. Here, although it is assumed that the SSID scanning is passive scanning, active scanning may be performed since an SSID to be searched for is known in advance.

When the SSID1 is retrieved by the SSID scanning, the processing section 210 obtains an affirmative determination result in step S303. In this case, the first access point AP1 transmits a beacon signal, and therefore, an available state is maintained. Therefore, it is assumed that switching from the first access point AP1 is not performed but a problem arises in independent communication between the first access point AP1 and the electronic apparatus 200. Therefore, in step S304, the processing section 210 executes a notification process for confirming settings.

For example, the processing section 210 performs a process of displaying text, such as text "Connection to the previously-connected AP is not available. Is there a change of a password or a setting of MAC address filtering in the AP? Please check the connection settings" in the display section 230. Furthermore, when the electronic apparatus 200 does not include the display section 230, the processing section 210 may perform control such that a light emitting section, such as an LED, included in the operation section 240 is turned on. When the user performs an operation on the operation section 240, such as a press on a button, prompted by the light emission, the electronic apparatus 200 performs control such that the text described above is printed using the print section 250.

When the SSID1 is not retrieved by the SSID scanning, the processing section 210 obtains a negative determination result in step S303. In this case, the electronic apparatus 200 may not receive the beacon signal supplied from the first access point AP1, and therefore, switching may be performed. In step S305, the processing section 210 determines whether the terminal device 100 is connected to another access point AP.

Figure 8:
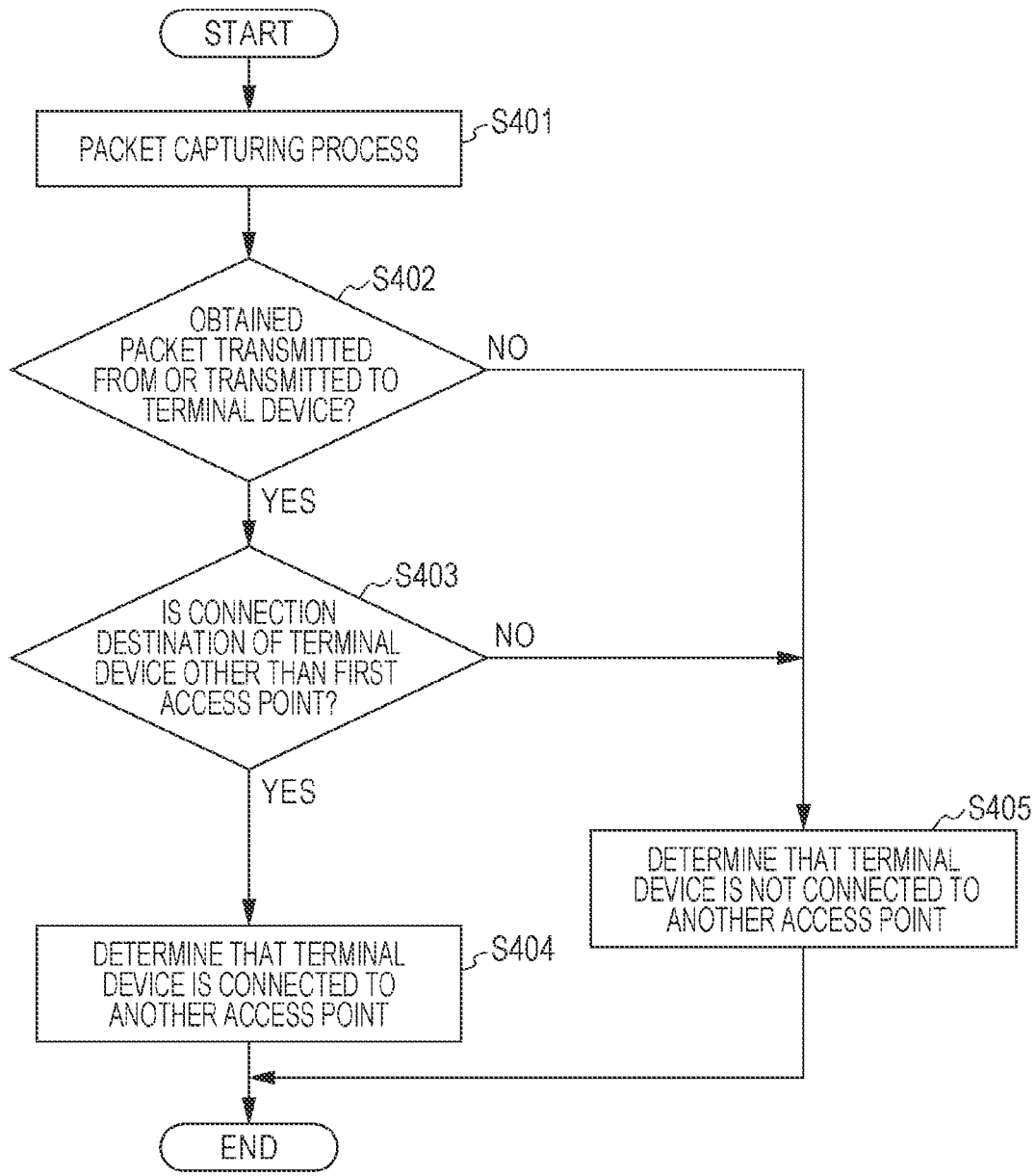
FIG. 8 is a flowchart of a process of determining connection between the terminal device and another access point.

FIG. 8 is a flowchart of the process in step S305 in FIG. 7. When this process is started, the processing section 210 performs a packet capturing process using the wireless communication section 220 in step S401. For example, the processing section 210 performs a process of setting the monitor mode to the Wi-Fi chip and a process of performing an operation in accordance with software corresponding to the network analyzer software.

FIG. 9 is a diagram illustrating an example of a data configuration of a result of the capturing process. Note that a result of the capturing process is referred to as a capturing result hereinafter. As illustrated in FIG. 9, the capturing result includes transmission source identification information for identifying an apparatus of a packet transmission source and transmission destination identification information for identifying an apparatus of a packet transmission destination. Accordingly, apparatuses that perform transmission and reception of a packet may be specified based on the capturing result. Therefore, a communication state of the terminal device 100 that has been connected through the first access point AP1 may be determined based on the capturing result.

The transmission source identification information identifies an apparatus of a packet transmission source and is a MAC address, for example. The transmission destination identification information identifies an apparatus of a packet transmission destination and is a MAC address, for example. Note that the packet capturing result may include an IP address or a host name, not illustrated, as information for specifying an apparatus of a transmission source and an apparatus of a transmission destination as illustrated in FIG. 9. Therefore, the information, such as an IP address, may be used as the identification information or the terminal identification information according to this embodiment. However, in this case, it should be noted that the IP address or the like is of the access point AP or of an apparatus that belongs to a network connected to the access point AP. It should be further noted that an IP address of the terminal device 100 may be changed due to switching of the access point AP.

The capturing result may include other information, such as a transmission source port number and a transmission destination port number as illustrated in FIG. 9. Furthermore, the capturing result may include information, not illustrated, such as a data length or a protocol.

Next, in step S402, the processing section 210 determines whether a packet transmitted from or transmitted to the terminal device 100 has been obtained by the capturing process. For example, the processing section 210 performs a process of extracting a packet corresponding to transmission source identification information of MAC_TM stored in step S103 of FIG. 5 from the capturing result as a terminal transmission packet. For example, the processing section 210 performs a process of extracting a packet corresponding to transmission destination identification information of MAC_TM from the capturing result as a terminal reception packet.

When the determination is affirmative in step S402, the processing section 210 determines whether a connection destination of the terminal device 100 is an apparatus other than the first access point AP1 in step S403. For example, the processing section 210 determines whether the transmission destination identification information of the terminal transmission packet is a MAC address other than MAC_AP1 stored in step S106 of FIG. 5. Furthermore, the processing section 210 determines whether the transmission source identification information of a terminal reception packet is a MAC address other than MAC_AP1.

When the determination is affirmative in step S402 and step S403, the processing section 210 determines that the terminal device 100 is connected to another access point AP in step S404. Specifically, the processing section obtains an affirmative determination result in step S305 in FIG. 7. Here, another access point AP is referred to as a second access point AP2. Specifically, the processing section 210 determines that switching from the first access point AP1 to the second access point AP2 has been performed as illustrated in A3 of FIG. 4. The transmission destination identification information of the terminal transmission packet or the transmission source identification information of the terminal reception packet correspond to MAC_AP2 that is the identification information of the second access point AP2.

On the other hand, when the determination is negative in step S402 or step S403, the processing section 210 determines that the terminal device 100 is not connected to another access point AP in step S405. Specifically, the processor obtains a negative determination result in step S305 in FIG. 7.

Note that, the negative determination result in step S402 corresponds to a state in which neither the terminal transmission packet nor the terminal reception packet is not captured. In this case, the terminal device 100 is not connected to any access point AP, and this is a state in which the access point AP is being switched, for example. For example, when the first access point AP1 is suddenly out of order, it may takes time from when the access point AP1 stops functions to when the second access point AP2 is installed, and in this time, a negative determination may be made in step S402.

When the determination is negative in step S403, transmission destination identification information of the terminal transmission packet or the transmission source identification information of the terminal reception packet is MAC_AP1 that is the identification information of the first access point AP1. In this state, connection between the terminal device 100 and the first access point AP1 is maintained. The process in step S403 is performed when the electronic apparatus 200 may not retrieve the SSID1 in step S303. A state in which the first access point AP1 does not transmit a beacon signal and a state in which the connection between the terminal device 100 and the first access point AP1 is maintained contradict each other, and therefore, the processing section 210 may determine that an error has occurred and perform an error process when the determination is negative in step S403.

Alternatively, when the SSID of the first access point AP1 is changed and the change is reflected in the wireless communication setting of the terminal device 100, for example, the electronic apparatus 200 may not retrieve the SSID1 and the connection between the terminal device 100 and the first access point AP1 may be maintained. The processing section 210 may determine that the SSID of the first access point AP1 is changed when the determination is negative in step S403.

Returning to FIG. 7, the description is continued. When the determination is negative in step S305, at least the switching is not completed and a notification indicating an access point AP after the switching may not be performed. Therefore, in step S306, the processor performs a process of displaying text, such as text "AP set in the printer is not found. Reset the wireless communication settings" in the display section 230. Furthermore, similarly to the example in step S304, the processing section 210 may perform control such that the text is printed using the print section 250 after a notification process, such as light emission, is performed.

Furthermore, when the determination is affirmative in step S305, it is determined that switching from the first access point AP1 to the second access point AP2 has been performed. Therefore, the processing section 210 performs a process of performing a notification indicating that the switching has been performed in step S307. For example, the processing section 210 performs a process of displaying text, such as text "AP has been changed. Update the wireless communication settings and connect to a new AP" in the display section 230. Also in this case, the processing section 210 may perform control such that the text is printed using the print section 250 after the notification process, such as light emission, is performed.

As illustrated in FIG. 8, in the method of this embodiment, the processing section 210 determines that switching from the first access point AP1 is performed when one of the transmission source identification information and the transmission destination identification information matches the terminal identification information and the other does not match the identification information of the first access point AP1. In this way, the determination as to whether the access point AP is switched may be made with high accuracy by monitoring the communication state of the terminal device 100. Accordingly, the user may be prompted to perform an appropriate operation suitable to a situation, for example.

In this case, as illustrated in step S301, the processing section 210 may start the packet capturing process under the conditions in which the wireless communication section 220 may not be connected to the first access point AP1. By this, when the probability that switching from the first access point AP1 is not performed is high, a process associated with the switching determination, such as the capturing process, may be omitted. Accordingly, a processing load may be reduced and accuracy of the determination of the switching may be improved.

Furthermore, as illustrated in step S302, the processing section 210 may start the packet capturing process when the wireless communication section 220 may not be connected to the first access point AP1 and when the first access point AP1 is not retrieved by the process of scanning access points AP. The process of scanning access points AP is specifically SSID scanning. By this, not only a state in which connection to the wireless communication section 220 is disconnected but also a state in which switching from the first access point AP1 is not performed may be determined using a state of transmission of a beacon signal. Accordingly, a processing load may be reduced and accuracy of the determination of the switching may be improved.

Furthermore, as illustrated in step S307, the processing section 210 performs the process of notifying the user that the switching from the first access point AP1 is performed when determining that switching from the first access point AP1 is performed. By this, a notification indicating that a factor that the electronic apparatus 200 may not be connected to the access point AP is the switching of the access point AP may be made for the user. Accordingly, the user may be prompted to perform an appropriate operation. As illustrated in A2 of FIG. 4 and FIG. 6, it is assumed that the resetting of the terminal device 100 is previously performed, and therefore, the user may perform settings of the electronic apparatus 200 only by the notification indicating the switching has been made.

Note that the processing section 210 of the electronic apparatus 200 may make a notification indicating information for facilitating the reset to be performed by the user. For example, the processing section 210 may make a notification indicating information for specifying the second access point AP2 serving as an access point AP after the switching. As described above, the capturing result includes a MAC address, an IP address, and a host name as information for identifying the second access point AP2. Therefore, the processing section 210 may make a notification indicating the second access point AP2 after the switching by displaying the information. Note that, even when the notification indicating the information, such as a MAC address, is made, it is not easy for the user to determine an apparatus corresponding to the information. Accordingly, the processing section 210 may make a notification indicating information useful for the connection to the second access point AP2, such as the SSID2 of the second access point.

Figure 10:
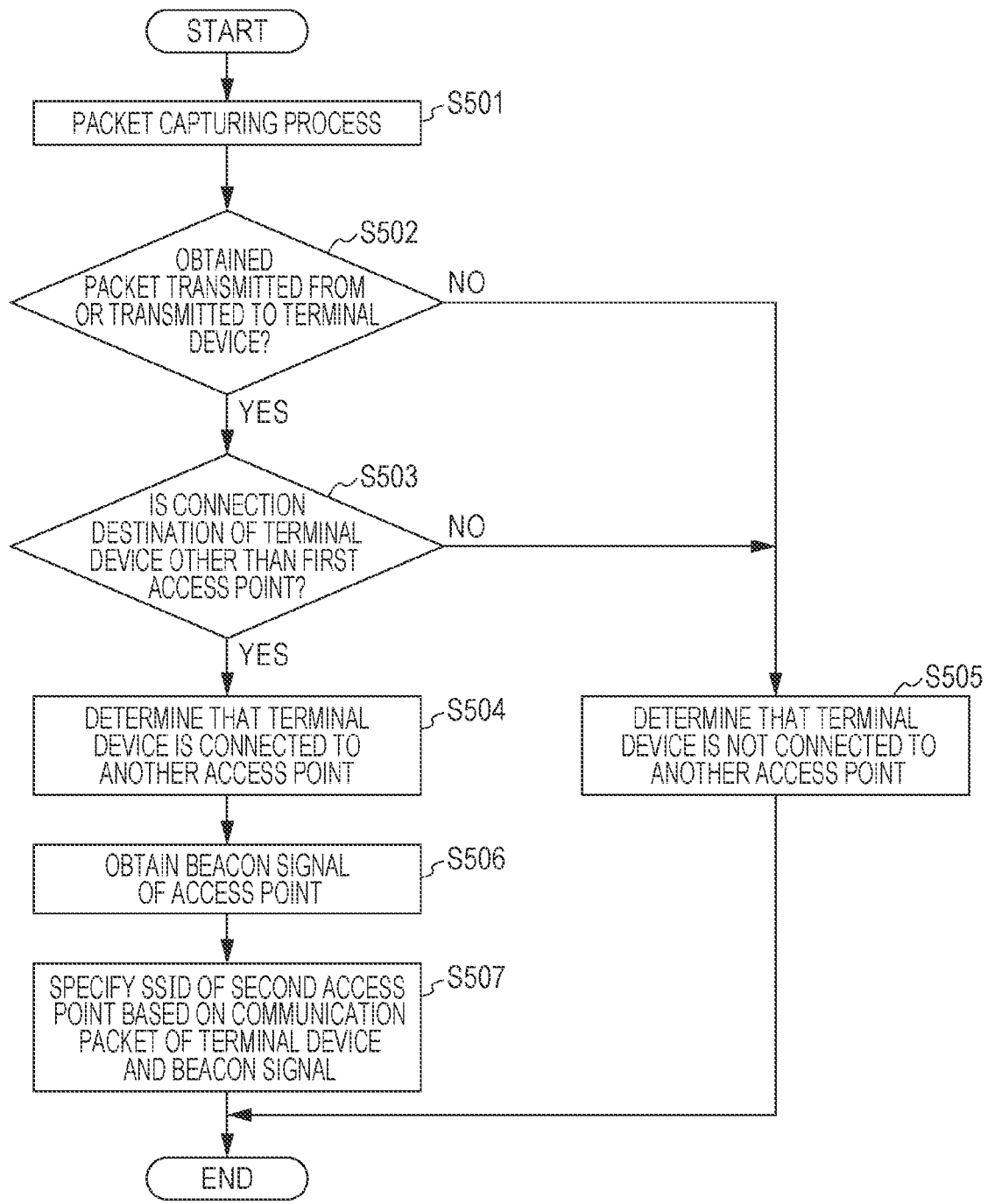
FIG. 10 is a flowchart of another process of determining connection between the terminal device and another access point.

FIG. 10 is a flowchart of another example of the process performed in step S305. Step S501 to step S505 in FIG. 10 are the same as step S401 to step S405 in FIG. 8. After the process in step S504, the processing section 210 obtains a beacon signal transmitted from the external access point AP in step S506. The beacon signal described herein is SSID broadcast. For example, the processing section 210 performs SSID scanning using the wireless communication section 220 when the determination is affirmative in step S503. Alternatively, in step S506, the processing section 210 may perform a process of reading a result of the SSID scanning performed in step S303 of FIG. 7.

Next, in step S507, the processing section 210 performs, based on a communication packet of the terminal device 100 and a result of the SSID scanning, a process of specifying an SSID of the second access point AP2. The communication packet is the terminal transmission packet or the terminal reception packet described above. As described above, MAC_AP2 that is the identification information of the second access point AP2 may be specified based on the communication packet.

Furthermore, a beacon signal of an access point AP includes an SSID and a MAC address of the access point AP. Therefore, the processing section 210 determines that a beacon signal having a MAC address corresponding to MAC_AP2 in at least one beacon signal received by the SSID scanning as a beacon signal of the second access point AP2. The processing section 210 determines that the SSID included in the beacon signal is the SSID2 of the second access point AP2.

Note that the beacon signal of the access point AP may be obtained in the capturing process in step S501. A transmission period of the beacon signal of the access point AP is short, such as approximately 0.1 sec. Therefore, when the wireless communication section 220 executes the capturing process for a certain period of time, a beacon signal may be received from the access point AP located near the electronic apparatus 200. The processing section 210 specifies the SSID2 that is the SSID of the second access point AP2 by extracting a packet corresponding to a beacon signal indicating the SSID and having transmission source identification information corresponding to MAC_AP2 from among capturing results.

Figure 11:
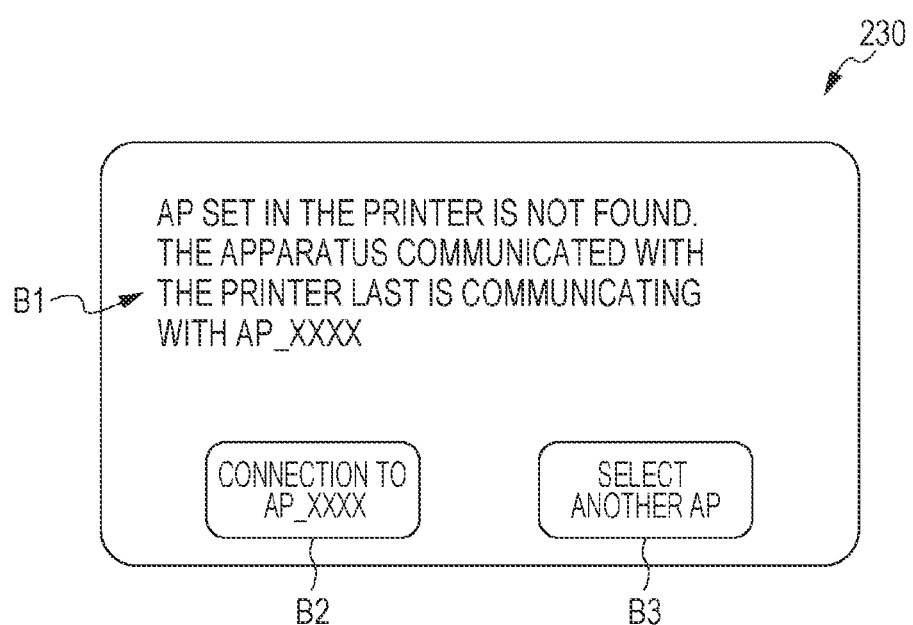
FIG. 11 is a diagram illustrating an example of a display screen.

FIG. 11 is a diagram illustrating an example of a screen displayed in the display section 230. As denoted by B1 in FIG. 11, the processor may display text information including information for specifying the second access point AP2 replaced the first access point AP1. The information for specifying the second access point AP2 is an SSID, for example. Furthermore, the processing section 210 may display an object, such as a button, for connection to the second access point AP2 as denoted by B2 in FIG. 11. When an operation of selecting the object is performed, the processing section 210 performs a process of connecting the wireless communication section 220 and the second access point AP2 to each other.

Furthermore, the processing section 210 may display an object, such as a button, for connection to an access point AP other than the second access point AP2 as denoted by B3 in FIG. 11. When the operation of selecting an object denoted by B3 is performed, the processing section 210 displays information on a list of SSIDs that is a result of the SSID scanning.

As described above with reference to FIG. 10, the processing section 210 may perform, based on the identification information of the second access point AP2 included in the capturing result and the beacon signal transmitted from the second access point AP2, a process of specifying the SSID of the second access point AP2. Furthermore, the processing section 210 may perform a process of making a notification of information on the specified SSID. In this way, when an SSID to be connected is displayed, an input of an SSID is not required to be performed by the user and only a password is required to be input. For example, when the operation is performed on the object denoted by B2 in FIG. 11, the processing section 210 performs a process of displaying a password input screen. Specifically, since the operation of selecting a connection target from among a plurality of access points AP may be omitted, a burden of the user at a time of the reset of the electronic apparatus 200 may be reduced.

Note that, as described above, the beacon signal includes an SSID of an access point AP and identification information. The processing section 210 specifies, based on the identification information included in the capturing result and the identification information included in the beacon signal, the SSID of the second access point AP2. More specifically, the processing section 210 specifies a beacon signal transmitted from the second access point AP2 from among a plurality of beacon signals so as to specify an SSID2 that is an SSID of the second access point AP2. In this way, an SSID of a desired access point AP may be appropriately specified by comparing the identification information of the access point AP included in the communication packet of the terminal device 100 with the identification information of the access point AP included in the beacon signal.

As described above, according to the method of this embodiment, when the access point AP is switched, the switching may be appropriately detected. Furthermore, the access point AP after the switching may be appropriately specified. Here, the specified second access point AP2 is a new connection destination of the terminal device 100 having history of connection to the electronic apparatus 200. Therefore, when the electronic apparatus 200 is connected to the second access point AP2, wireless communication may be performed between the terminal device 100 and the electronic apparatus 200. For example, the terminal device 100 may cause the electronic apparatus 200 to execute a job.

3. Modification

The example in which only one terminal device 100 is used is illustrated hereinabove. However, two or more terminal devices 100 of this embodiment may be used.

FIG. 12 is a diagram schematically illustrating a process according to a modification. C1 in FIG. 12 illustrates a state before switching from a first access point AP1 is performed.

In the example in C1, a first terminal device 100-1 and a second terminal device 100-2 are individually connected to a first access point AP1 serving as an external access point AP. An electronic apparatus 200 is also connected to the first access point AP1.

In a state of C1, the first terminal device 100-1 and the electronic apparatus 200 may execute wireless communication through the first access point AP1. Similarly, the second terminal device 100-2 and the electronic apparatus 200 may execute wireless communication through the first access point AP1. It is assumed that the first terminal device 100-1 and the second terminal device 100-2 individually issue an instruction for executing a job to the electronic apparatus 200. In this case, the electronic apparatus 200 stores MAC_AP1 serving as identification information for identifying the first access point AP1 and MAC_TM1 serving as terminal identification information identifying the terminal device 100-1 in association with each other. Furthermore, the electronic apparatus 200 stores MAC_AP1 and MAC_TM2 serving as terminal identification information identifying the second terminal device 100-2 in association with each other.

Also in this modification, the electronic apparatus 200 periodically executes the process illustrated in FIG. 7. When the determination is affirmative in step S301 or the determination is affirmative in step S303, the access point AP is not switched. Therefore, the processing section 210 determines normal or performs a notification process for prompting confirmation of settings of the existing first access point AP1.

Furthermore, when the determination is negative in step S303, the processing section 210 performs the process in FIG. 8 of FIG. 10 on a first terminal device 100-1 and a second terminal device 100-2 in step S305. In other words, the electronic apparatus 200 determines a communication state of the first terminal device 100-1 and a communication state of the second terminal device 100-2 by performing the packet capturing process.

It is assumed that the access point AP after the switching is one of second access points AP2 and both the first terminal device 100-1 and the second terminal device 100-2 are connected to the second access point AP2. In this case, the processing section 210 obtains a packet having transmission source identification information and transmission destination identification information, one of which is MAC_TM1 and the other of which is MAC_AP2, as a capturing result. Furthermore, the processing section 210 obtains a packet having transmission source identification information and transmission destination identification information, one of which is MAC_TM2 and the other of which is MAC_AP2. The processing section 210 determines that the access point AP after the switching is the second access point AP2 from either of the packets. Therefore, similarly to the example described above, the processing section 210 performs a notification process for recommending connection to the second access point AP2. For example, the processing section 210 performs a process of displaying a screen illustrated in FIG. 11. When an SSID to be recommended is displayed, the processing section 210 performs a display process for recommending the SSID2.

However, as illustrated in C2 of FIG. 12, an access point AP is switched to a plurality of access points AP. It is assumed that a second access point AP2 and a third access point AP3 are newly employed, the first terminal device 100-1 is connected to the second access point AP2, and the second terminal device 100-2 is connected to the third access point AP3. Hereinafter, a MAC address of the third access point AP3 is denoted by MAC_AP3.

In this case, the processing section 210 obtains a first packet having transmission source identification information and transmission destination identification information, one of which is MAC_TM1 and the other of which is MAC_AP2, as a capturing result. Furthermore, the processing section 210 obtains a second packet having transmission source identification information and transmission destination identification information, one of which is MAC_TM2 and the other of which is MAC_AP3 indicating the third access point AP3, as a capturing result.

The processing section 210 determines that the access point AP after the switching is the second access point AP2 when a process is performed based on the first packet. The processing section 210 determines that the access point AP after the switching is the third access point AP3 when a process is performed based on the second packet. As illustrated in FIG. 10, when a process of specifying an SSID is performed, both the SSID2 and the SSID3 are candidates of a recommended SSID.

When the electronic apparatus 200 is connected to the second access point AP2, the first terminal device 100-1 may wirelessly communicate with the electronic apparatus 200, but the second terminal device 100-2 may not communicate with the electronic apparatus 200. Furthermore, when the electronic apparatus 200 is connected to the third access point AP3, the second terminal device 100-2 may communicate with the electronic apparatus 200 but the first terminal device 100-1 may not communicate with the electronic apparatus 200. The communication-available terminal device 100 is changed depending of a recommended SSID, and therefore, the processing section 210 may execute a notification process taking usability into consideration.

For example, the processing section 210 may set, based on job record information associated with the terminal device 100, notification priority levels when a plurality of SSIDs are specified.

Here, the job record information indicates records of jobs executed by the terminal device 100 by using the function of the electronic apparatus 200. For example, when executing, based on a job execution instruction supplied from a given terminal device 100, a job as indicated in step S104 and step S105 of FIG. 5, the electronic apparatus 200 stores not only a MAC address of the terminal device 100 but also information on the executed job as the job record information. When the plurality of terminal devices 100 exist as illustrated in FIG. 12, the electronic apparatus 200 stores first job record information that is job record information of the first terminal device 100-1 and second job record information that is job record information of the second terminal device 100-2 in the storage section 260.

The job record information includes information indicating a job execution timing, for example. In this case, a notification priority level becomes higher as an execution timing is newer. It is assumed here that the first terminal device 100-1 has a record indicating a job executed at a timing close to a current time point and a period of time has relatively passed after the second terminal device 100-2 executes a job. In this case, the first terminal device 100-1 is highly probable to execute a job using the electronic apparatus 200 again when compared with the second terminal device 100-2.

Accordingly, the processing section 210 may set a notification priority level of the SSID2 specified based on a communication packet of the first terminal device 100-1 higher than that of the SSID3 specified based on a communication packet of the second terminal device 100-2. For example, the processing section 210 displays information for specifying the second access point AP2, that is, the SSID2, as AP_XXXX illustrated in the screen of FIG. 11. On the other hand, the SSID3 is not displayed in the screen of FIG. 11, and is displayed when an object indicated by B3 is selected, for example.

In this way, connection between the terminal device 100 that highly possibly communicates with the electronic apparatus 200 and the electronic apparatus 200 may be prompted to the user, and therefore, usability may be improved.

Note that the job record information may indicate the number of times jobs are executed. For example, as the number of times a given terminal device 100 executes jobs is larger, the processing section 210 sets a higher notification priority level of an SSID determined based on the terminal device 100. Alternatively, the processing section 210 may set, based on both the job execution timing and the number of times jobs are executed, a notification priority level. For example, the notification priority level is numerical value data indicating that the smaller a value of the level is, the higher the priority is. A value of the notification priority level is represented by f (an execution timing, the number of times execution is performed) using a function f of the execution timing and the number of times jobs are executed, for example. The function f outputs a smaller value as an execution timing is closer to a current time point or as the number of times jobs are executed is larger.

Note that, when the electronic apparatus 200 is a printer, a job record corresponds to a print job record. Specifically, the number of times jobs are executed corresponds to the number of times print is executed, and the job execution timing corresponds to a print timing. Furthermore, a print job record may include a period of time required for printing, the number of printed sheets, and a consumption amount of consumables, such as tonner. By this, a load applied to the printer is taken into consideration, and therefore, a notification priority level may be appropriately determined.

Furthermore, in C2 of FIG. 12, the example in which the terminal devices 100 are connected to the second access point AP2 and the third access point AP3, respectively, is illustrated. Therefore, a notification priority level of the SSID2 is determined based on the first job record information of the first terminal device 100-1, and a notification priority level of the SSID3 is determined based on the second job record information of the second terminal device 100-2.

Note that a plurality of terminal devices 100 having a job record of the access point AP after the switching may be connected. For example, the second terminal device 100-2 and the third terminal device, not illustrated, may be connected to the third access point AP3. The third terminal device has a job record of a job executed by the electronic apparatus 200 through the first access point AP1. The electronic apparatus 200 stores the third job record information of the third terminal device in the storage section 260.

In this case, the processing section 210 may determine a notification priority level of the SSID3 based on one of the second job record information and the third job record information. For example, the processing section 210 obtains notification priority levels using both the second job record information and the third job execution information and selects a higher one of the priority levels as a notification priority level of the SSID3. Alternatively, the processing section 210 may determine a notification priority level of the SSID3 by comprehensively using the second job record information and the third job record information. For example, when the job record information corresponds to the number of times jobs are executed, the processing section 210 obtains, based on a sum of the number of times the second terminal device 100-2 executes jobs and the number of times the third terminal device executes jobs, a notification priority level of the SSID3. Note that the number of terminal devices 100 connected to the single access point AP is not limited to 2 and may expand to N (N is an integer equal to or larger than 2).

Note that, although this embodiment is described in detail as described above, those skilled in the art may easily understand that various modifications may be made without substantially departing from novelty and effects of the present disclosure. Accordingly, these modifications are included in the scope of the present disclosure. For example, a term described with a different term that has wider meaning or the same meaning at least once in the specification and the drawings may be replaced by the different term in any portion in the specification and the drawings. Furthermore, all combinations of the embodiment and the modifications are included in the scope of the present disclosure. Furthermore, the configurations, the operations, and the like of the terminal device, the electronic apparatus, and the like are not limited to those described in this embodiment and various modifications may be made.

What is claimed is:

1. An electronic apparatus comprising:
   a wireless communication section configured to perform wireless communication through an access point external to the electronic apparatus;
   a processing section configured to perform communication control of the wireless communication section; and
   a storage section, wherein
   in a state in which the wireless communication section and a first access point external to the electronic apparatus are connected with each other, the storage section stores, in association with each other, terminal identification information for identifying a terminal device that performed wireless communication through the first access point and identification information for identifying the first access point,
   the wireless communication section performs a process of capturing a packet that is transmitted from or received by, through wireless communication, the terminal device specified by the terminal identification information, and
   when determining, based on a capturing result of the process of capturing, the identification information of the first access point, and the terminal identification information of the terminal device, that the terminal device performs wireless communication with a second access point that is different from the first access point and external to the electronic apparatus, the processing section determines that switching from the first access point is performed.

2. The electronic apparatus according to claim 1, wherein when determining that switching from the first access point is performed, the processing section performs a process of notifying a user that switching from the first access point is performed.

3. The electronic apparatus according to claim 1, wherein the capturing result includes transmission source identification information for identifying an apparatus of a transmission source of the packet and transmission destination identification information for identifying an apparatus of a transmission destination of the packet.

4. The electronic apparatus according to claim 3, wherein when one of the transmission source identification information and the transmission destination identification information matches the terminal identification information and an other of the transmission source identification information and the transmission destination identification information does not match the identification information of the first access point, the processing section determines that switching from the first access point is performed.

5. The electronic apparatus according to claim 1, wherein under conditions in which the wireless communication section is not configured to be connected to the first access point, the processing section starts the process of capturing the packet.

6. The electronic apparatus according to claim 5, wherein when the wireless communication section is not configured to be connected to the first access point and the first access point is not retrieved by a process of scanning the access point, the processing section starts the process of capturing the packet.

7. The electronic apparatus according to claim 1, wherein the processing section performs a process of specifying, based on the identification information of the second access point included in the capturing result and a beacon signal transmitted from the second access point, a service set identifier (SSID) of the second access point and notifying a user of information of the SSID specified.

8. The electronic apparatus according to claim 7, wherein the beacon signal includes the SSID and the identification information of the access point that transmitted the beacon signal and the processing section specifies, based on the identification information included in the capturing result and the identification information included in the beacon signal, the SSID of the second access point.

9. The electronic apparatus according to claim 8, wherein when a plurality of SSIDs, each of which is the SSID specified by the processing section, are specified, the processing section sets, based on job record information associated with the terminal device, notification priority levels.

10. A communication control method comprising:

in a state in which connection to a first access point is established, storing, in association with each other, terminal identification information for identifying a terminal device that performed wireless communication through the first access point external to the electronic apparatus and identification information for identifying the first access point;

when the connection to the first access point is disconnected, performing a process of capturing a packet that is transmitted from or received by, through wireless communication, the terminal device specified by the terminal identification information; and when determining, based on a capturing result of the process of capturing, the identification information of the first access point, and the terminal identification information of the terminal device, that the terminal device performs wireless communication with a second access point that is different from the first access point and external to the electronic apparatus, determining that switching from the first access point is performed.

* * * * *